United States Patent
Maddalozzo, Jr. et al.

(10) Patent No.: US 6,177,929 B1
(45) Date of Patent: Jan. 23, 2001

(54) USER INTERACTIVE EDITING OF COMPUTER DISPLAYED INFORMATION OF A PLURALITY OF INFORMATION TYPES THROUGH MULTIPLE INFORMATION TYPE BUFFERS AND CORRESPONDING MULTIPLE EDITORS

(75) Inventors: John Maddalozzo, Jr.; Gerald Francis McBrearty; Johnny Meng-Han Shieh, all of Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/137,505

(22) Filed: Aug. 20, 1998

(51) Int. Cl.[7] .......................................... G06F 3/00
(52) U.S. Cl. ............................ 345/326; 345/333; 707/516
(58) Field of Search .................................. 345/326, 333, 345/335; 707/515, 516

(56) References Cited

U.S. PATENT DOCUMENTS

| | | | |
|---|---|---|---|
| 5,146,553 | * 9/1992 | Noguchi et al. | 707/516 |
| 5,404,442 | 4/1995 | Foster et al. | 395/159 |
| 5,408,599 | * 4/1995 | Nomura et al. | 707/516 |
| 5,740,455 | * 4/1998 | Pavley et al. | 707/515 |
| 5,835,919 | * 11/1998 | Stern et al. | 707/515 |

* cited by examiner

*Primary Examiner*—Raymond J. Bayerl
*Assistant Examiner*—Sy D. Luu
(74) *Attorney, Agent, or Firm*—J. B. Kraft; Volel Emile

(57) ABSTRACT

An interactive display computer editing system is provided for the separation of different displayed information types in a designated portion of a document into separate buffers together with means for separately editing the different information types in the buffers. The computer controlled display system includes means for designating a portion of the displayed information in combination with means for storing information of a first type from said portion in a first buffer and means for storing information of a second type from said portion in a second buffer. In addition, first means for editing said stored information of said first type are provided together with second means for separately editing said stored information of said second type. Accordingly, the user need make no editing compromises. The editor best suited for each information type may be used to edit that particular information type.

24 Claims, 4 Drawing Sheets

USER INTERACTIVE EDITING OF COMPUTER DISPLAYED INFORMATION OF A PLURALITY OF INFORMATION TYPES THROUGH MULTIPLE INFORMATION TYPE BUFFERS AND CORRESPONDING MULTIPLE EDITORS

TECHNICAL FIELD

The present invention relates to user interactive computer supported display technology and particularly to such user interactive systems and methods which are user friendly and provide interactive user interfaces which are easy to use for the editing of the displayed information.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past few years. As a result of these changes, it seems as if virtually all aspects of human endeavor in the industrialized world requires the distribution of information through interactive computer display interfaces. Information for reporting, marketing, technology and educational purposes, which, in the past, was permitted days and even months for distribution, are now customarily required to be "on-line" in a matter of hours and even minutes. The electronic documents through which such information is distributed is made up of pages, e.g. Internet Web pages of a variety of information types, e.g. text, graphics, photographs and even more complex image types. Because of the limited time factors involved in the creation and updating of computer displayed documents, there is a need for methods and systems for editing such documents which fast and relatively effective. Also, with the emergence of desktop publishing in all areas of publishing: periodicals, newspapers, technical journals and business reports, the need for effective computer display editing has been further reinforced. There are a wide variety of display documents and page editors commercially available. However, each editing program is to a considerable extent specialized in handling one type of display information. For example, the Corel Draw™ series places its emphasis on graphics editing, Adobe Photoshop™ emphasizes editing photographic and similar images while the word processing programs such as Lotus WordPro™ are directed primarily at text. While each editing program does provide some capability with other information types, its strength is usually with one displayed information type. As a result, the user editing displayed information is often forced to make a compromise to achieve fast editing; he has to select the editor directed to his primary information type and accept the more limited function in that editor with respect to other information types in the pages of the documents which he is editing. The present invention is directed to satisfying this deficiency in the editing of displayed documents.

SUMMARY OF THE INVENTION

The present invention provides an interactive display computer editing system providing for the separation of different displayed information types in a designated portion of a document into separate buffers together with means for separately editing the different information types in the buffers. The computer controlled display system includes means for designating a portion of said displayed information in combination with means for storing information of a first type from said portion in a first buffer and means for storing information of a second type from said portion in a second buffer. In addition, first means for editing said stored information of said first type are provided together with a second means for separately editing said stored information of said second type. Accordingly, the user need make no editing compromises. The editor best suited for each information type may be used to edit that particular information type. Further, means for transferring information between buffers is provided; this is particularly valuable for transferring information after it has been edited.

Further, an important aspect of the invention involves means for determining the types of the information in the designated portion wherein the means for storing information in the first and said second buffers is responsive to the means for determining said types of information so that the information is appropriately sorted. An important distinction in types of information is between graphics and text, and such information types may be stored in separate buffers and edited separately. The information in separate buffers may be displayed and edited simultaneously. The invention is applicable to editing more than two information types with separate buffers and editors being provided for each type.

DETAILED DESCRIPTION OF THE PREFERRED EMBODIMENT

Figure 1:
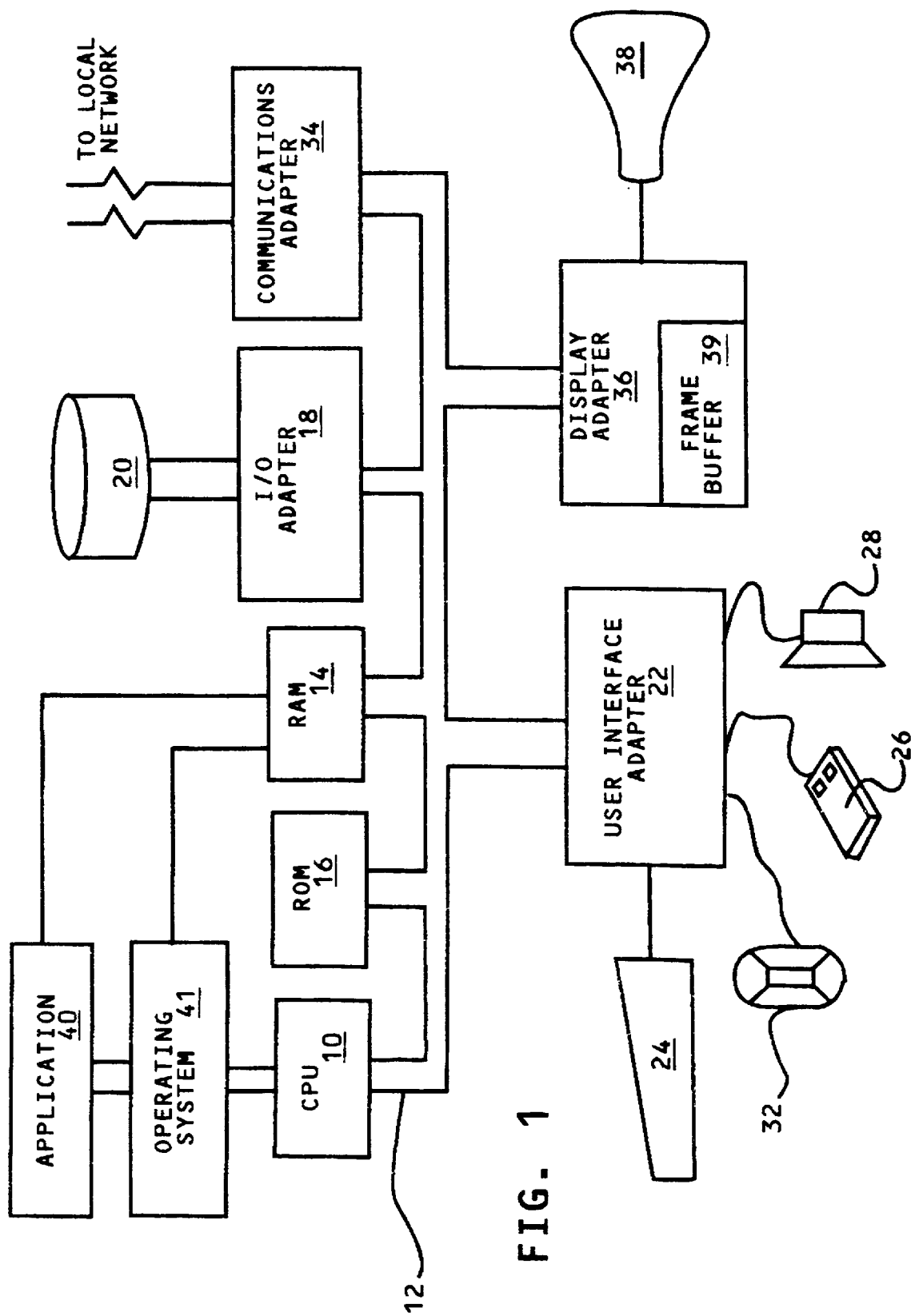
FIG. 1 is a block diagram of a data processing system including a central processing unit which is capable of implementing the user interactive display editing system of the present invention.

Referring to FIG. 1, a typical data processing system is shown which may function as the computer controlled display terminal used in implementing the interactive editing system of the present invention by separating the cut portion of a page based on information types into separately edited buffers under the control of the computer of FIG. 1. A central processing unit (CPU) 10, such as one of the PC microprocessors available from International Business Machines Corporation (IBM), is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from IBM (OS/2 is a trademark of International Business Machines Corporation); Microsoft's Windows 95™ or Windows NT™, as well as UNIX or AIX operating systems. A program for separating cut portions of a display into a plurality of buffers which are separately edited, application 40, to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes, of course, the Internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices, particularly the mouse with which the user may define the portions of the displayed information on a display to be edited, after which the system separates the portions into a plurality of buffers based upon the types of information displayed to be respectively edited by different editors in a manner to be subsequently described. During such interactive editing, the information in the separate buffers will be brought into separate windows in the operating system format for separate interactive editing using different editing programs.

Display adapter 36 includes a frame buffer 39 which is a storage device that holds a representation of each pixel on the display screen 38. Images may be stored in frame buffer 39 for display on monitor 38 through various components, such as a digital to analog converter (not shown) and the like. By using the aforementioned I/O devices a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system. In the implementation of the invention, it will frequently be the case that the pages being edited will have been received from or transmitted to other terminals within a network. The display terminal of FIG. 1 communicates with the network through the communications adapter 34.

Figure 2:
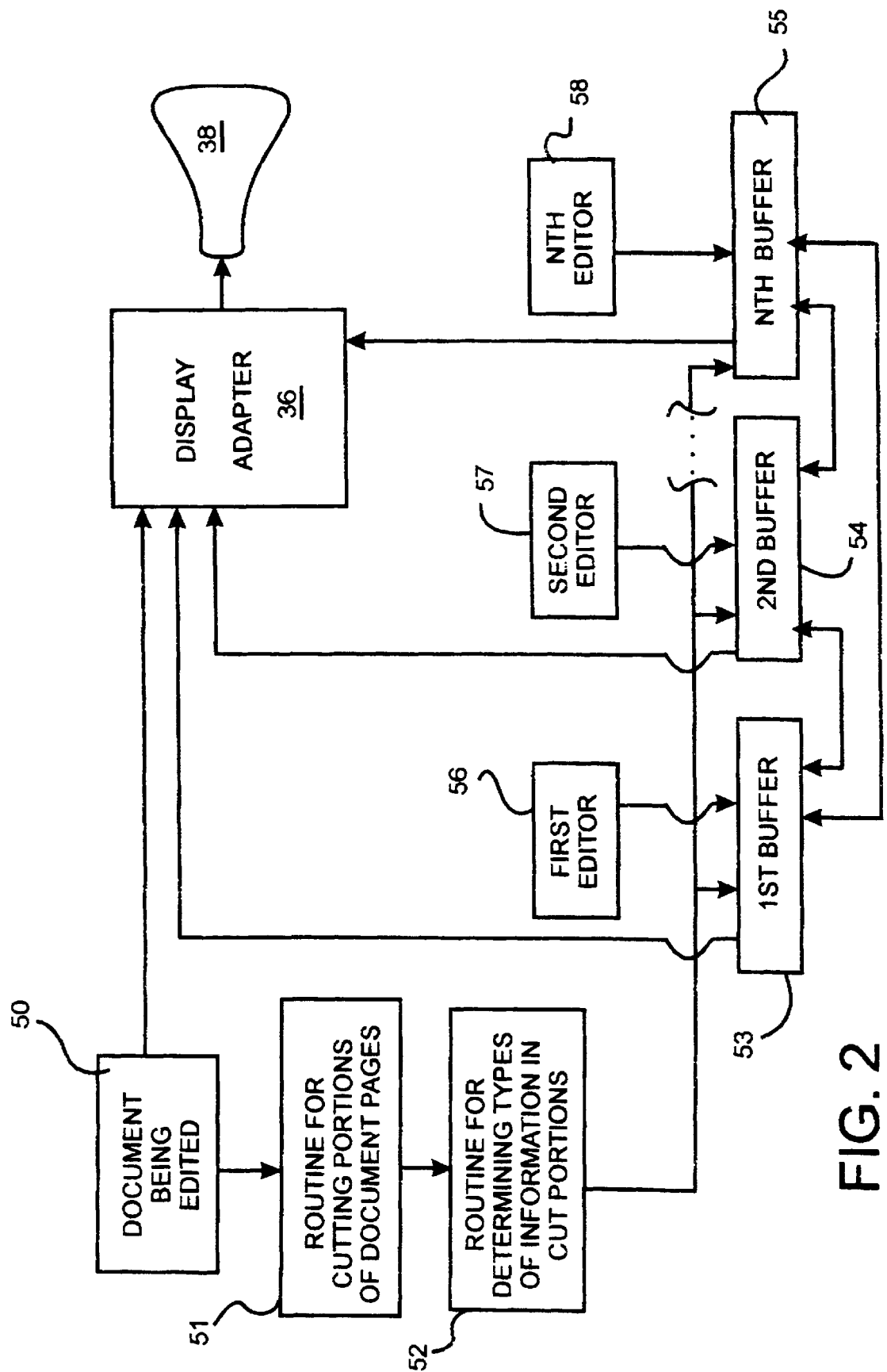
FIG. 2 is a block diagram of a subsystem in the computer display system of FIG. 1 for implementing the invention.

Referring now to FIG. 2, there will be described how the present invention may be implemented. The logic shown in FIG. 2 may be considered to be in the RAM 14 of FIG. 1 during the operation of the invention. The document being edited 50 may consist of one or more pages. Each page being displayed is stored in RAM 14 and may be displayed on display 38 via display adapter 36. A routine 51 is provided through which the user may interactively, via his mouse, designate a portion of the displayed page which he wishes to cut out for editing purposes, e.g. a cut routine provided by Windows 95. The system then provides a routine 52 for determining the types of information in the cut or designated portion, e.g. any conventional routine for distinguishing between graphics types of displayed information and text types of information; such routines conventionally use pel densities or pel patterns. Then, dependent upon the type of information sensed, the portion is loaded in one or more of multiple buffers, 1st, 2nd and Nth, respectively 53, 54 and 55, each respectively to be edited by 1st, 2nd and Nth editors, respectively 56, 57 and 58.

Figure 3:
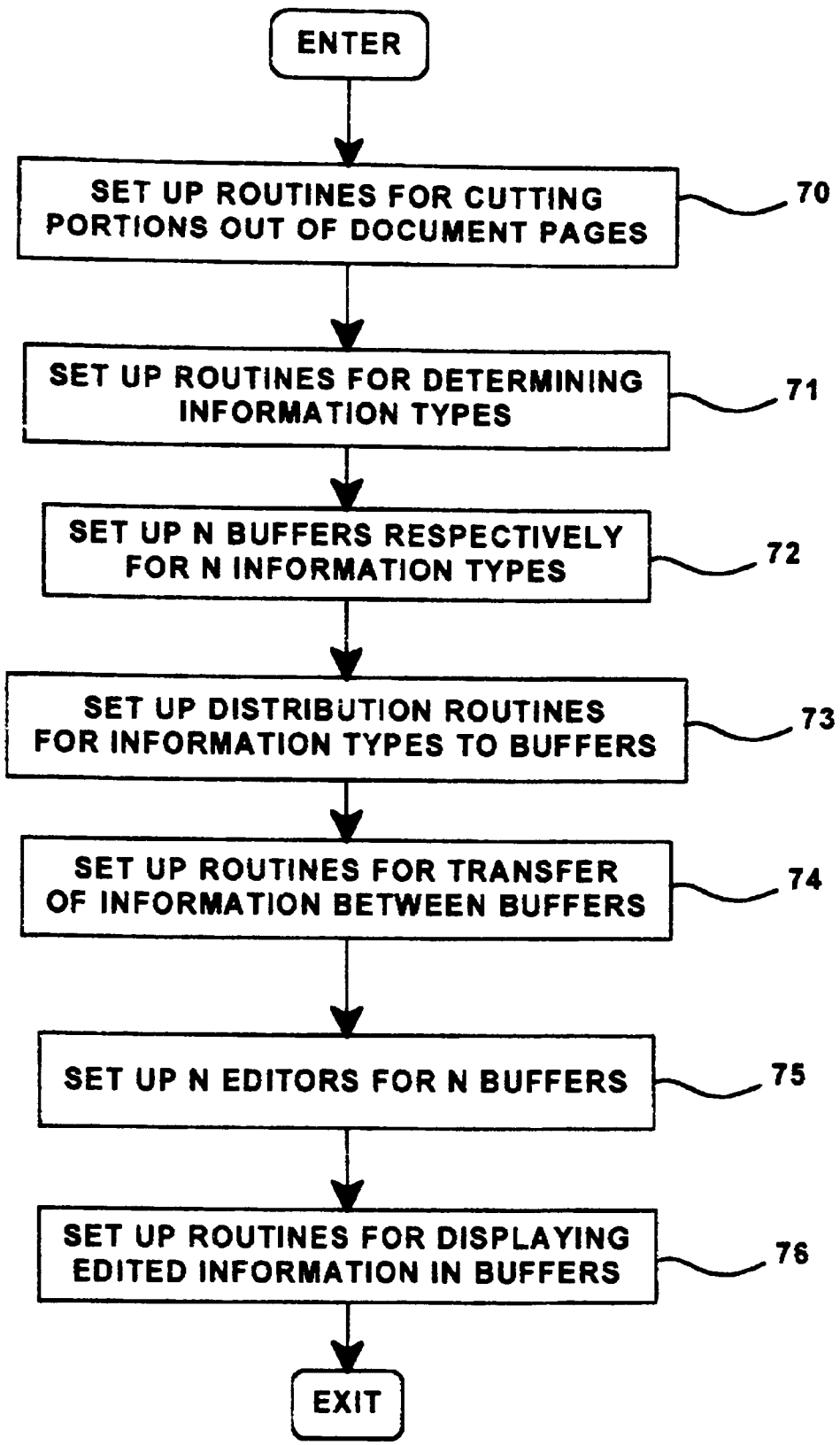
FIG. 3 is a flowchart of the basic elements of the program in a computer controlled display terminal for the use of multiple editors and multiple buffers for the editing of displayed information of different types.
Figure 4:
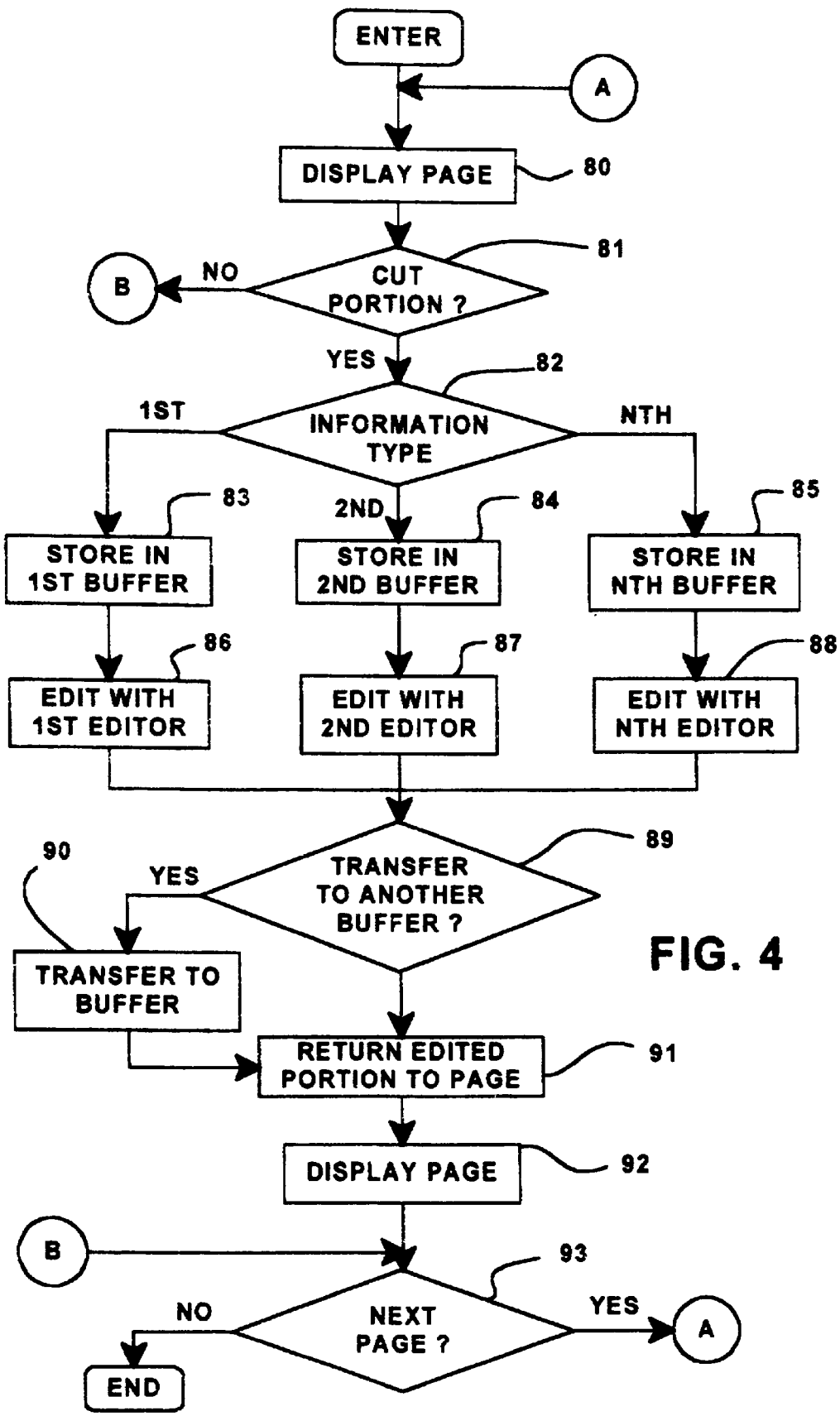
FIG. 4 is a flowchart of the steps involved in a typical editing session of a portion of a display page using the program of FIG. 3.

Now with reference to FIGS. 3 and 4, we will describe a process implemented by the present invention in conjunction with the flowcharts of these figures. FIG. 3 is a flowchart showing the development of a display process according to the present invention for editing cut portions out of a displayed page so that different information types in the portion cut to be edited are stored in different buffers to be edited by different editing programs respectively optimum for the type of information being edited. Conventional routines for designating portions to be cut out of document pages are set up, step 70. Then, routines are set up for determining the information types of the cut portions of the displayed pages, 71. Next, N number of buffers are set up, each respectively for the storage of a different information type, step 72. Distribution routines are set up for the distribution of each information type to the buffer set up for that type, step 73. Also, with respect to the buffers, routines are set up for transferring information between buffers so that information separated for editing purposes may be recombined if needed in reconstituting the document page, step 74. Lastly, editing programs are set up: one for each of the buffers, step 76, so that the different types of information in each of the buffers may be edited by the editing program which is optimum for the respective type of information.

Now with respect to FIG. 4, there will be described a simple illustrative process for editing designated cut portions of a displayed page having different information types. First, the page is displayed, step 80. Then, step 81, a determination is made as to whether a portion of the page has been cut for editing purposes. If Yes, then, step 81, a determination is made as to whether 1st, 2nd or Nth information type is in the cut portion and the respective information is stored in either the 1st (step 83), 2nd (step 84) or the Nth (step 85) buffers which in turn are respectively edited with the corresponding 1st (step 86), 2nd (step 87) or Nth (step 88) editors. After completion of editing, a determination is made as to whether the information in any one of the buffers is to be transferred to another of the buffers, step 89. If a cut or designated portion of text has graphics and text which are separately buffered and edited, it is at times desirable to combine the text into graphics. Thus, the text type of information was to be transferred into the buffer containing the graphics and the decision from step 89 would be Yes, then the transfer would be made, step 90. After such a transfer or if the decision from step 89 would be No, the edited cut portion is returned to the page or another page, step 91, and that page is displayed. At this point, the editing of the cut portion is completed and the flow proceeds to decision step 93. Also, if an earlier determination had been made in decision step 81 that there was no designated or cut portion for editing, the process would have proceeded to step 93 via branch "B". A determination is made in step 93 as to whether there is a next page to be edited. If Yes, then the process branches back to step 80 via branch "A" and the process is repeated for the next page. If the decision from step 93 is No, the editing process is ended.

The editing described above with respect to steps 86 through 88 may be conventional optimal editing for the particular types of displayed information in the respective buffers, steps 83 through 85. Each editing process may be interactively carried out in its own window where the operating system is a windows operating system, such as Windows 95. A plurality of such editing processes may be simultaneously displayed and carried out in their respective windows.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled system for displaying a graphical user interface including different types of displayed information comprising:

means for designating a portion of said displayed information;

means for determining types of the information in said designated portion, means responsive to said means for determining for storing information of a first type from said portion in a first buffer;

means responsive to said means for determining for storing information of a second type from said portion in a second buffer;

first means for editing said stored information of said first type, and second means for editing said stored information of said second type.

2. The system of claim 1 further including means for transferring at least a part of the information stored in one of said buffers to the other of said buffers.

3. The system of claim 2 wherein said information is transferred after the editing thereof.

4. The system of claim 3 wherein the information stored in said one buffer is primarily text, and the information stored in said other buffer is primarily graphics.

5. The system of claim 1 wherein said first and said second editing means include means for displaying the information stored in said first and second buffers for user interactive editing.

6. The system of claim 5 wherein the information stored in said first and second buffers is displayed simultaneously so that the user may edit the information in said first and second buffers simultaneously.

7. The system of claim 1 further including:

means for storing information of at least one additional type in at least one additional buffer, and at least one additional means for editing said information of said at least one additional type.

8. The system of claim 7, wherein each of said editing means include means for displaying the information stored in each of said buffers for user interactive editing, and the information stored in a selected plurality of said buffers is displayed simultaneously whereby the user may edit the information in said selected plurality of buffers simultaneously.

9. In a computer controlled system for displaying a graphical user interface including different types of displayed information, a method of editing said displayed information comprising:

designating a portion of said displayed information;

determining types of the information in said designated portion, responsive to said determination of types of information, storing information of a first type from said portion in a first buffer;

responsive to said determination of types of information, storing information of a second type from said portion in a second buffer;

editing said stored information of said first type, and separately editing said stored information of said second type.

10. The editing method of claim 9 further including the step of transferring at least a part of the information stored in one of said buffers to the other of said buffers.

11. The editing method of claim 10 wherein said information is transferred after the editing thereof.

12. The editing method of claim 11 wherein the information stored in said one buffer is primarily text, and the information stored in said other buffer is primarily graphics.

13. The editing method of claim 9, wherein said first and said second editing steps each include displaying the information stored in said first and second buffers for user interactive editing.

14. The editing method of claim 13 wherein the information stored in said first and second buffers is displayed simultaneously so that the user may edit the information in said first and second buffers simultaneously.

15. The editing method of claim 9 further including:

storing information of at least one additional type in at least one additional buffer, and editing said information of said at least one additional type separately from the editing of stored information of said first and second types.

16. The editing method of claim 15 wherein each of said editing steps include displaying the information stored in each of said buffers for user interactive editing, and the information stored in a selected plurality of said buffers is displayed simultaneously whereby the user may edit the information in said selected plurality of buffers simultaneously.

17. In a user interactive computer controlled system for displaying a graphical user interface including different types of displayed information, a computer program having program code included on a computer readable medium for editing said displayed information comprising:

means for designating a portion of said displayed information;

means for determining types of the information in said designated portion, means responsive to said means for determining for storing information of a first type from said portion in a first buffer;

means responsive to said means for determining for storing information of a second type from said portion in a second buffer;

first means for editing said stored information of said first type, and second means for editing said stored information of said second type.

18. The computer program of claim 17 further including means for transferring at least a part of the information stored in one of said buffers to the other of said buffers.

19. The computer program of claim 18 wherein said information is transferred after the editing thereof.

20. The computer program of claim 19 wherein the information stored in said one buffer is primarily text, and the information stored in said other buffer is primarily graphics.

21. The computer program of claim 17 wherein said first and said second editing means include means for displaying the information stored in said first and second buffers for user interactive editing.

22. The computer program of claim 21 wherein the information stored in said first and second buffers is displayed simultaneously so that the user may edit the information in said first and second buffers simultaneously.

23. The computer program of claim 17 further including:
means for storing information of at least one additional type in at least one additional buffer, and
at least one additional means for editing said information of said at least one additional type.

24. The computer program of claim 23 wherein each of said editing means includes means for displaying the information stored in each of said buffers for user interactive editing, and
the information stored in a selected plurality of said buffers is displayed simultaneously whereby the user may edit the information in said selected plurality of buffers simultaneously.

* * * * *